3,192,235
SUBSTITUTED 1,4,4a,9,9a,10-HEXAHYDRO-
4,10-DIOXOANTHRACENES
Raymond George Wilkinson, Montvale, N.J., and Thomas Lynn Fields, Pearl River, and Andrew Steven Kende, Hartsdale, N.Y., assignors to American Cyanamid Company, New York, N.Y., a corporation of Maine
No Drawing. Filed Nov. 28, 1961, Ser. No. 155,484
6 Claims. (Cl. 260—351)

This invention relates to new organic compounds and, more particularly, is concerned with novel substituted 1,4,4a,9,9a,10 - hexahydro-4,10-dioxoanthracenes and to novel methods of preparing these compounds. The novel substituted 1,4,4a,9,9a,10 - hexahydro-4,10-dioxoanthracenes of the present invention may be represented by the following general formula:

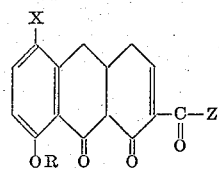

wherein X is halogen, R is hydrogen or lower alkyl, and Z is hydroxy, halogen, lower alkoxy, phenyl lower alkoxy, amino or substituted amino. Suitable lower alkyl and lower alkoxy groups contemplated by the present invention are those having up to about six carbon atoms. Suitable phenyl lower alkoxy substituents are, for example, benzyloxy and phenethoxy. Halogen is exemplified by chlorine and bromine. Suitable substituted amino groups are, for example, methylamine, dimethylamino, ethylamino, diethylamino, piperidino, morpholino, pyrrolidino and N-methylpiperizino.

The novel compounds of the present invention are particularly useful as chelating, complexing or sequestering agents for polyvalent metallic ions. The complexes formed with polyvalent metallic ions are particularly stable and usually quite soluble in various organic solvents. This, of course, makes them useful for a variety of purposes such as in biological experimentation where the removal of traces of polyvalent metallic ions may be of great importance. They are also useful in analyses for polyvalent metallic ions which may be complexed and extracted by means of these reagents. Other uses common to sequestering agents are also apparent from these compounds.

The novel compounds of the present invention are obtainable as crystalline materials having characteristic melting points and absorption spectra. They are appreciably soluble in many organic solvents such as lower alkanols, acetone, ethyl acetate, and the like. They are, however, generally insoluble in water. The novel compounds of the present invention are biologically active and have been found to possess antifungal activity. The minimal inhibitory concentrations, expressed in gammas per milliliter, of three typical compounds of the present invention against *Staphylococcus aureus* when measured by a standard turbidimetric procedure are set forth in the following table.

TABLE I

| Compound: | Minimal inhibitory conc. in. γ/ml. |
|---|---|
| Benzyl 5 - hydroxy - 8 - chloro - 1,4,4a,9,9a, 10 - hexahydro 1 4,10 - dioxoanthracene - 3-carboxylate | 0.279 |
| Ethyl 5 - hydroxy - 8 - chloro - 1,4,4a,9,9a,10-hexahydro - 4,10 - dioxoanthracene-3-carboxylate | 0.189 |
| 5 - hydroxy - 8 - chloro - 1,4,4a,9,9a,10 - hexahydro - 4,10 - dioxoanthracene - 3 - carboxamide | 0.550 |

The novel compounds of the present invention are prepared by a series of reactions starting with the appropriately substituted 1,2,3,4-tetrahydro-4-oxo-2-naphthaleneacetaldehydes disclosed and claimed in the copending application of Raymond G. Wilkinson et al., Serial No. 821,-093, filed June 18, 1959, now Patent No. 3,102,914. The series of reactions leading to the novel compounds of the present invention may be represented by the following reaction scheme:

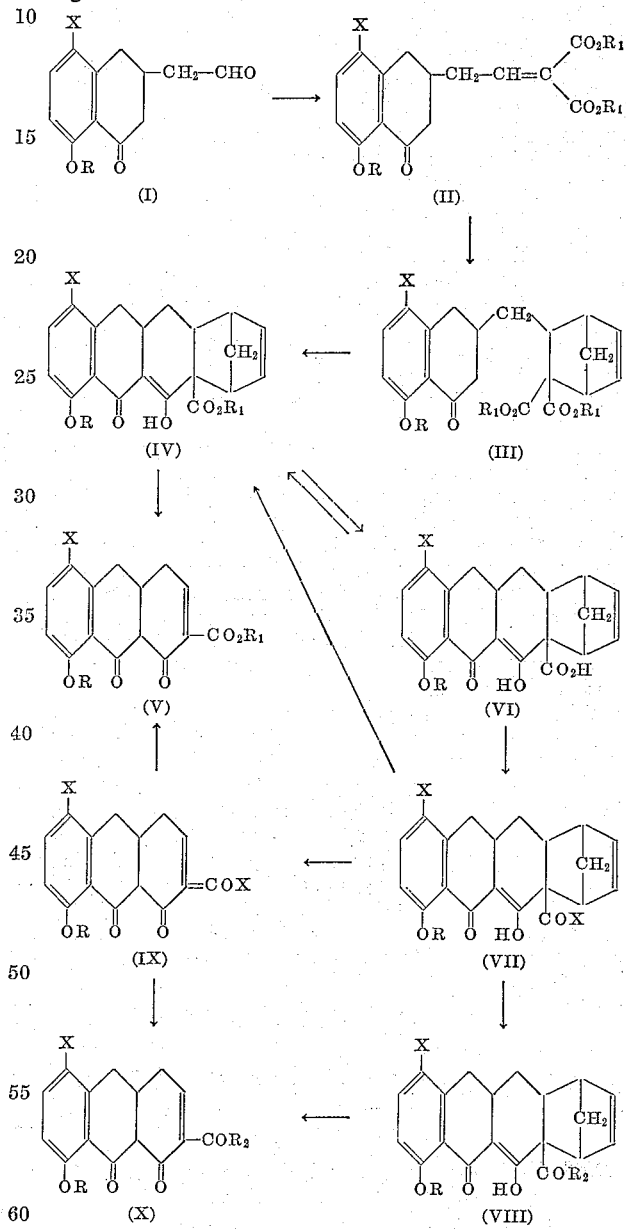

wherein R is hydrogen or lower alkyl, $R_1$ is lower alkyl or phenyl lower alkyl, $R_2$ is amino or substituted amino, and X is halogen. Suitable lower alkyl groups contemplated by the present invention are those having up to about six carbon atoms. Suitable phenyl lower alkyl substituents are, for example, benzyl, phenethyl, etc. Halogen is exemplified by chlorine and bromine. Suitable substituted amino groups are, for example, methylamino, dimethylamino, ethylamino, diethylamino, piperidino, morpholino, pyrrolidino and N-methylpiperizino.

In accordance with the present invention, an appropriately substituted 1,2,3,4 - tetrahydro - 4 - oxo-2-naphthaleneacetaldehyde (I) is first converted to the corresponding 1,2,3,4 - tetrahydro-4-oxo-2-naphthylethylidene malonic ester (II) by treatment with a di(lower alkyl) or di(phenyl lower alkyl)ester of malonic acid, conveniently diethyl malonate or dibenzyl malonate. This malonic ester is then subjected to a Diels-Alder condensation with cyclopentadiene whereby the corresponding cyclopentadiene adduct (III) is obtained. This Diels-Alder condensation is conveniently carried out in an inert organic solvent such as toluene or xylene, but a solvent may be omitted. Elevated temperatures up to about 150° C. and a period of time up to about 48 hours may be needed to complete the condensation.

The cyclopentadiene adduct is then cyclized to the corresponding 1,4,11,11a,12,12a-hexahydro-5-hydroxy-6-oxo-1,4-methanonaphthacene-4a(6H)-carboxylate (IV) with a strongly basic condensing agent such as an alkali metal hydride, an alkali metal alkoxide, an alkali metal amide or an alkali metal triphenyl methide in a neutral anhydrous solvent such as benzene, toluene, xylene, or the like, at a temperature of from 50° C. to 150° C. The 1,4,11,11a, 12,12a - hexahydro - 5 - hydroxy-6-oxo-1,4-methanonaphthacene-4a(6H)-carboxylate is then thermally decomposed to the corresponding 1,4,4a,9,9a,10-hexahydro-4,10-dioxoanthracene-3-carboxylate (V). This thermal decomposition occurs when a pentacyclic intermediate of the present invention is maintained at a temperature above 110° C., conveniently at the reflux temperature of an inert organic solvent such as o-dichlorobenzene, Decalin, or the like, for a period of time ranging from about 15 minutes up to about one hour.

Alternatively, the pentacyclic esters (IV) may be saponified to yield the corresponding pentacyclic acids (VI) which, in turn, may be converted to the corresponding pentacyclic acid halides (VII) by standard procedures. Both the pentacyclic acids (VI) and the pentacyclic acid halides (VII) may be reconverted to pentacyclic esters (IV) of choice by standard esterification procedures. The pentacyclic acid halides (VII) may be thermally decomposed to the corresponding 1,4,4a,9,9a,10-hexahydro-4,10-dioxoanthracene-3-carboxyl halides (IX) under the same conditions set forth above for the thermal decomposition of the pentacyclic esters (IV). The 1,4,4a,9,-9a,10 - hexahydro - 4,10 - dioxoanthracene - 3 - carboxyl halides (IX) may be converted either to the corresponding 1,4,4a,9,9a,10-hexahydro-4,10-dioxoanthracene-3-carboxylates (V) by standard esterification procedures or to the corresponding 1,4,4a,9,9a,10-hexahydro-4,10-dioxoanthracene-3-carboxamides (X) by standard amidation procedures. The pentacyclic acid halides (VII) may be converted to the corresponding pentacyclic amides (VIII) by standard amidation procedures. The pentacyclic amides (VIII) may then be thermally decomposed to the corresponding 1,4,4a,9,9a,10-hexahydro-4,10-dioxoanthracene-3-carboxamides (X) under the same conditions set forth above for the thermal decomposition of the pentacyclic esters (IV).

The invention will be described in greater detail in conjunction with the following specific examples.

EXAMPLE 1

Diethyl 8-chloro-1,2,3,4-tetrahydro-5-methoxy-4-oxo-2-naphthylethylidene malonate A solution of 7.3 g. of 5-methoxy-8-chloro-1,2,3,4-tetrahydro-4-oxonaphthalene-2-acetaldehyde, 4.5 ml. of diethyl malonate, 2.0 ml. of glacial acetic acid, and 0.5 ml. of piperidine in 50 ml. of dry benzene was brought to gradual reflux under a nitrogen atmosphere. The reaction mixture was slowly and partially distilled with the use of a water separator until no more water was produced by the condensation (two hours). After an additional 30 minutes of refluxing the cooled reaction mixture was washed with dilute aqueous hydrochloric acid, then with dilute aqueous sodium bicarbonate solution, and finally with water. The organic layer was separated and dried over anhydrous magnesium sulfate. The dried organic layer was concentrated under vacuum to give 9.38 g. of a brown oil which gradually solidified to the crude product melting at 65–70° C. The crude yield was 81% of theoretical. An analytical sample was prepared by recrystallizing a small sample of crude product twice from ether, M.P. 72.5–74.0° C.

EXAMPLE 2

Diethyl 8-chloro-1,2,3,4-tetrahydro-5-hydroxy-4-oxo-2-naphthylethylidene malonate A solution of 16.0 g. of 5-hydroxy-8-chloro-1,2,3,4-tetrahydro-4-oxonaphthalene-2-acetaldehyde, 10.0 ml. of diethyl malonate, 0.8 ml. of glacial acetic acid, and 0.4 ml. of piperidine in 50 ml. of dry benzene was brought to gradual reflux under a nitrogen atmosphere. The reaction mixture was slowly and partially distilled with the use of a water separator until no more water was produced by the condensation (about 2 hours). After an additional 30 minutes of refluxing the product was isolated according to the procedure of Example 1.

EXAMPLE 3

Dibenzyl 8-chloro-1,2,3,4-tetrahydro-5-hydroxy-4-oxo-2-naphthylethylidene malonate A solution of 1.9 g. of 5-hydroxy-8-chloro-1,2,3,4-tetrahydro-4-oxonaphthalene-2-acetaldehyde, 2.4 g. of dibenzyl malonate, 0.2 ml. of glacial acetic acid, and 0.06 ml. of piperidine in 50 ml. of dry benzene was brought to gradual reflux under a nitrogen atmosphere. The reaction mixture was slowly and partially distilled with the use of a water separator until no more water was produced by the condensation (about 2 hours). After an additional 30 minutes of refluxing, the product was isolated according to the procedure of Example 1.

EXAMPLE 4

Cyclopentadiene adduct of diethyl 8-chloro-1,2,3,4-tetrahydro-5-methoxy-4-oxo-2-naphthylethylidene malonate A mixture of 6.3 g. of diethyl 8-chloro-1,2,3,4-tetrahydro-5-methoxy-4-oxo-2-naphthylethylidene malonate and 5.0 ml. of cyclopentadiene in 12 ml. of dry toluene was placed in a glass-lined bomb and held sealed at 135–140° C. for 16 hours. Removal of solvents by evaporation under vacuum gave the product in crude form.

EXAMPLE 5

Cyclopentadiene adduct of diethyl 8-chloro-1,2,3,4-tetrahydro-5-hydroxy-4-oxo-2-naphthylethylidene malonate A mixture of 10.5 g. of diethyl 8-chloro-1,2,3,4-tetrahydro - 5 - hydroxy - 4 - oxo - 2 - naphthylethylidene malonate and 11.0 ml. of cyclopentadiene in 7.0 ml. of dry toluene was placed in a glass-lined bomb and held sealed at 135–140° C. for 16 hours. Removal of solvents by evaporation under vacuum gave the product in crude form.

EXAMPLE 6

Cyclopentadiene adduct of dibenzyl 8-chloro-1,2,3,4-tetrahydro-5-hydroxy-4-oxo-2-naphthylethylidene malonate A mixture of 3.99 g. of dibenzyl 8-chloro-1,2,3,4-tetrahydro-5-hydroxy-4-oxo-2-naphthylethylidene malonate and 4.0 ml. of freshly distilled cyclopentadiene in 5.0 ml. of toluene was placed in a glass-lined bomb and held sealed at 135–140° C. for 16 hours. Removal of solvents by evaporation under vacuum gave the product in crude form.

EXAMPLE 7

Ethyl 10-chloro-1,4,11,11a,12,12a-hexahydro-5-hydroxy-7-methoxy- 6 - oxo-1,4-methanonaphthacene-4a(6H)-carboxylate The crude product of Example 4 was dissolved in 130 ml. of toluene and to this solution was added 8.5 g. of 50% sodium hydride in mineral oil. The resulting mixture was stirred under a nitrogen atmosphere at reflux temperature for 65 minutes. The cooled reaction mixture was neutralized by the gradual addition of excess glacial acetic acid, followed by dry ethanol. After dilution with 100 ml. of ethyl acetate and 200 ml. of 1 N hydrochloric acid, the organic layer was washed with water, dried and evaporated under vacuum to a tan oil. This oil, the pentacyclic ethyl ester product, was characterized by ultraviolet maxima at 353 and 262 mµ in methanol solution, and at 368 and 262 mµ in methanolic 0.01 N sodium hydroxide solution.

EXAMPLE 8

*Ethyl 10-chloro-1,4,11,11a,12,12a-hexahydro-5,7-dihydroxy-6-oxo-1,4-methanonaphthacene-4a(6H)-carboxylate*

This product was prepared according to the procedure of Example 7, using as starting material the crude product of Example 5. The pentacyclic ethyl ester was isolated in the form of yellow needles, M.P. 172–173° C. The product was characterized by ultraviolet maxima at 369, 351, 271 and 227 mµ in methanol solution.

EXAMPLE 9

*Benzyl 10-chloro-1,4,11,11a,12,12a-hexahydro-5,7-dihydroxy-6-oxo-1,4-methanonaphthacene-4a(6H)-carboxylate*

This product was prepared according to the procedure of Example 7, using as starting material the crude product of Example 6. The pentacyclic benzyl ester product was isolated in the form of a gum. Chromatography over 50 g. of silica gel, using 70% benzene–30% petroleum ether as eluant, gave 1.25 g. of a gum which, upon crystallization from ether, deposited 0.3 g. of yellow crystals, M.P. 169–172° C., of the pentacyclic benzyl ester product.

EXAMPLE 10

*Ethyl 5-methoxy-8-chloro-1,4,4a,9,9a,10-hexahydro-4,10-dioxoanthracene-3-carboxylate*

A solution of 0.5 g. of ethyl 10-chloro-1,4,11,11a,12,12a-hexahydro-5-hydroxy-7-methoxy-6-oxo-1,4-methanonaphthacene-4a(6H)-carboxylate, the product of Example 7, in 10 ml. of o-dichlorobenzene was brought to reflux in a nitrogen atmosphere for approximately one hour. A drop of glacial acetic acid was added to the refluxing mixture. The reaction mixture was then cooled and the solvent was evaporated under vacuum. The isolated product was characterized by ultraviolet maxima at 356 mµ in methanol solution, and at 387 and 371 mµ in methanolic 0.01 N sodium hydroxide solution.

EXAMPLE 11

*Ethyl 5-hydroxy-8-chloro-1,4,4a,9,9a,10-hexahydro-4,10-dioxoanthracene-3-carboxylate*

Thirty mg. of ethyl 10-chloro-1,4,11,11a,12,12a-hexahydro-5,7-dihydroxy-6-oxo-1,4-methanonaphthacene-4a(6H)-carboxylate, the product of Example 8, was thermally decomposed according to the procedure of Example 10. The isolated product was recrystallized from ether to give orange-yellow crystals of ethyl 5-hydroxy-8-chloro-1,4,4a,9,9a,10-hexahydro-4,10-dioxoanthracene-3-carboxylate, M.P. 131° C.

EXAMPLE 12

*Benzyl 5-hydroxy-8-chloro-1,4,4a,9,9a,10-hexahydro-4,10-dioxoanthracene-3-carboxylate*

Two hundred mg. of benzyl 10-chloro-1,4,11,11a,12,12a-hexahydro-5,7-dihydroxy-6-oxo-1,4-methanonaphthacene-4a(6H)-carboxylate, the product of Example 9, was thermally decomposed according to the procedure of Example 10. There was thus obtained 85 mg. of the desired product, M.P. 137–138° C.

EXAMPLE 13

*10-chloro-1,4,11,11a,12,12a-hexahydro-5,7-dihydroxy-6-oxo-1,4-methanonaphthacene-4a(6H)-carboxylic acid*

Benzyl 10-chloro-1,4,11,11a,12,12a-hexahydro-5,7-dihydroxy-6-oxo-1,4-methanonaphthacene-4a(6H)-carboxylate, 0.425 g., was saponified by refluxing for 4 hours under a nitrogen atmosphere in 15 ml. of 40% aqueous potassium hydroxide solution and 5 ml. of methanol. The crude product, recovered by filtration after acidification of the reaction mixture, was recrystallized from ether yielding the carboxylic acid product melting at 177.5–179.0° C. (dec.).

EXAMPLE 14

*10-chloro-1,4,11,11a,12,12a-hexahydro-5,7-dihydroxy-6-oxo-1,4-methanonaphthacene-4a(6H)-carboxylic acid*

Ethyl 10-chloro-1,4,11,11a,12,12a-hexahydro-5,7-dihydroxy-6-oxo-1,4-methanonaphthacene-4a(6H)-carboxylate, 0.090 g., was saponified according to the procedure of Example 13 to yield the same product, M.P. 172–174° C.

EXAMPLE 15

*10-chloro-1,4,11,11a,12,12a-hexahydro-5,7-dihydroxy-6-oxo-1,4-methanonaphthacene-4a(6H)-carbonyl chloride*

To a suspension of 54 mg. of 10-chloro-1,4,11,11a,12,12a-hexahydro-5,7-dihydroxy-6-oxo-1,4-methanonaphthacene-4a(6H)-carboxylic acid in 2 ml. of dry benzene was added 3 mg. of dimethyl formamide and then 0.20 ml. of freshly-distilled thionyl chloride. The reaction mixture was stirred at room temperature under a drying tube for 45 minutes, by which time complete solution had occurred. The mixture was diluted with 20 ml. of dry benzene and evaporated to dryness in vacuum at room temperature. There were obtained, as the residue, 57 mg. of the yellow crystalline acid chloride, having the characteristic carbonyl maximum near 5.60µ in the infrared spectrum.

EXAMPLE 16

*5-hydroxy-8-chloro-1,4,4a,9,9a,10-hexahydro-4,10-dioxoanthracene-3-carboxamide*

A benzene solution of 10-chloro-1,4,11,11a,12,12a-hexahydro-5,7-dihydroxy-6-oxo-1,4-methanonaphthacene-4a(6H)-carbonyl chloride, prepared from 11 mg. of the corresponding acid by the method of Example 15, was saturated with dry gaseous ammonia for ten minutes at room temperature. Cold dilute hydrochloric acid was then added, the organic layer was diluted with ethyl acetate, washed with dilute acid and then with water. After drying, the solvents were removed in vacuo to give the pentacyclic carboxamide. This intermediate was dissolved in 5 ml. of o-dichlorobenzene and the solution refluxed in a nitrogen stream for 15 minutes. Evaporation of solvent gave 3 mg. of the crystalline 5-hydroxy-8-chloro-1,4,4a,9,9a,10-hexahydro-4,10-dioxoanthracene-3-carboxamide, characterized by amide carbonyl absorption at 5.90µ in the infrared and ultraviolet absorption at 393 mµ in methanol.

What is claimed is:
1. A compound of the formula:

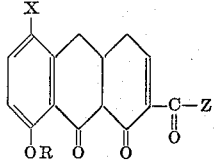

wherein X is selected from the group consisting of chlorine and bromine; R is selected from the group consisting of hydrogen and lower alkyl; and Z is selected from the group consisting of lower alkoxy and phenyl lower alkoxy.

2. Ethyl 5-methoxy-8-chloro-1,4,4a,9,9a,10-hexahydro-4,10-dioxoanthracene-3-carboxylate.

3. Ethyl 5-hydroxy-8-chloro-1,4,4a,9,9a,10-hexahydro-4,10-dioxanthracene-3-carboxylate.

4. Benzyl 5-methoxy-8-chloro-1,4,4a,9,9a,10-hexahydro-4,10-dioxoanthracene-3-carboxylate.

5. Benzyl 5-hydroxy-8-chloro-1,4,4a,9,9a,10-hexahydro-4,10-dioxanthracene-3-carboxylate.

6. The method of preparing a compound of the formula:

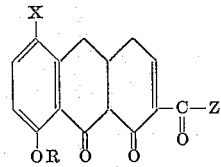

wherein X is selected from the group consisting of chlorine and bromine; R is selected from the group consisting of hydrogen and lower alkyl; and Z is selected from the group consisting of lower alkoxy and phenyl lower alkoxy; which comprises treating a 1,2,3,4-tetrahydro-4-oxo-2-naphthaleneacetaldehyde with a malonic ester to form the corresponding 1,2,3,4-tetrahydro-4-oxo-2-naphthylethylidene malonate, treating said malonate with cyclopentadiene to form the corresponding cyclopentadiene adduct, treating said adduct with a strongly basic cyclizing agent under anhydrous conditions to form the corresponding 1,4,11,11a,12,12a-hexahydro-5-hydroxy-6-oxo-1,4-methanonaphthacene-4a(6H)-carboxylate, and thermally decomposing said carboxylate at a temperature above 100° C.

References Cited by the Examiner

UNITED STATES PATENTS 3,013,063  12/61  Fields et al. _____ 260—473

OTHER REFERENCES

Muxfeldt: Ber. Deut. Chem., volume 92, page 3130 (1959).

Muxfeldt et al.: Chem. Abstracts, volume 53, page 16088d (1959).

LORRAINE A. WEINBERGER, *Primary Examiner.*

DUVAL McCUTCHEN, LEON ZITVER, LORRAINE A. WEINBERGER, *Examiners.*